April 20, 1937.    E. E. MOYER    2,078,152
PHASE SHIFTING CIRCUIT
Filed Jan. 25, 1935
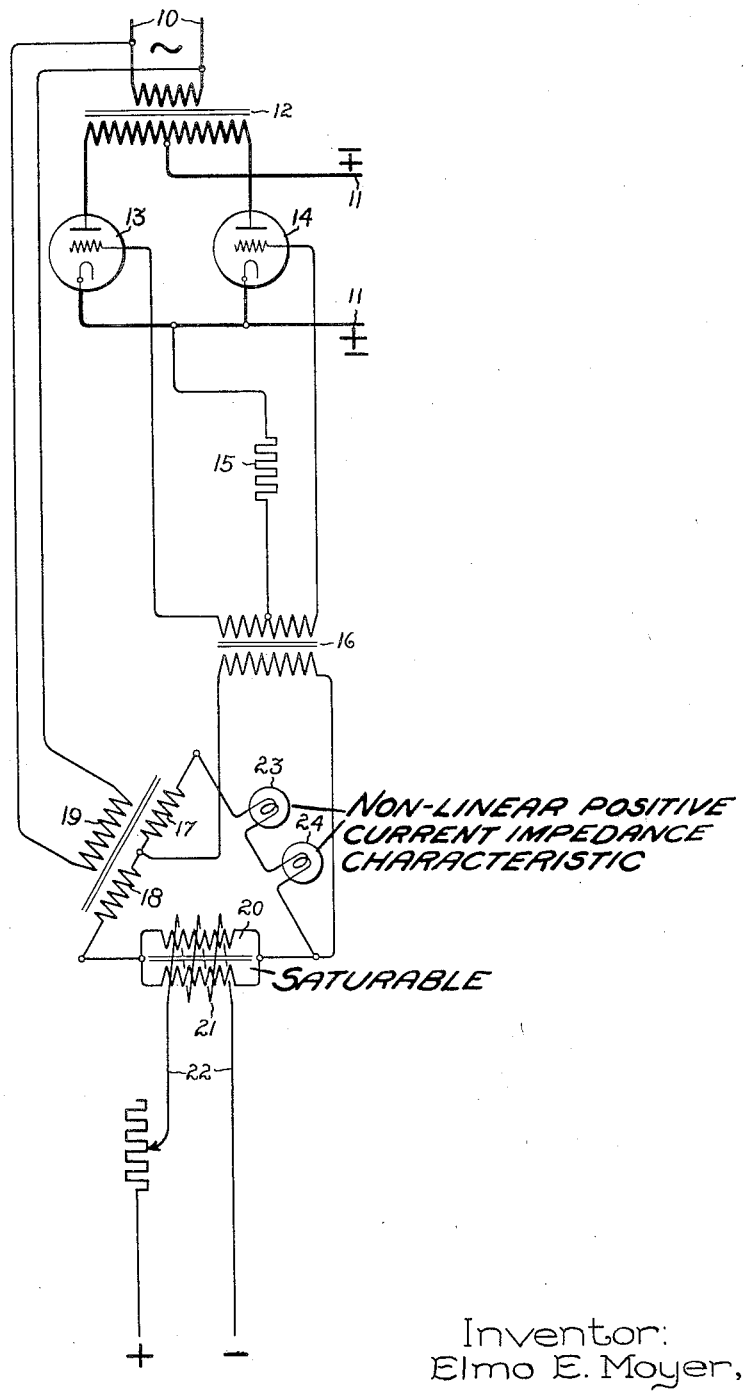
Inventor:
Elmo E. Moyer,
by Harry E. Dunham
His Attorney.

Patented Apr. 20, 1937

2,078,152

UNITED STATES PATENT OFFICE 2,078,152

PHASE SHIFTING CIRCUIT

Elmo E. Moyer, Scotia, N. Y., assignor to General Electric Company, a corporation of New York Application January 25, 1935, Serial No. 3,492

8 Claims. (Cl. 172—238)

My invention relates to electric circuits for shifting the phase of a periodic potential derived from a source with respect to the potential of that source and more particularly to such electric circuits by means of which a shift in phase of 180 degrees and more may be obtained by variation of the circuit elements within practical limits.

My invention is of general application in electric control and regulating systems, although it is particularly adapted for use in connection with electric power converting apparatus for transmitting energy between direct and alternating current systems or between two alternating current systems by the use of electric valves. In such systems it is customary to control the transmission of power between the two current systems by shifting the phase of the potentials applied to the control grids of the valves with respect to the anode potentials. Hertofore phase shifting circuits have been devised to secure a complete 180 degree phase shift, but it is often desirable to obtain wide variation in phase shift with a very small controlling action.

It is an object of my invention to provide an improved static phase shifting circuit which is sensitive to a relative small change of a controlling action or quantity.

It is a further object of my invention to provide an improved static phase shifting bridge circuit wherein a controlling action on only one arm of the bridge will produce an inverse electrical controlling action on the adjacent arm of the bridge.

According to the illustrated form of my invention I provide a static phase shifting circuit in the form of a bridge wherein one pair of adjacent arms comprises impedances and the other pair of adjacent arms comprises a current responsive variable resistor and a variable reactor, respectively. The periodic or alternating potential is applied across one diagonal of the bridge and the output circuit is connected across the other diagonal of the bridge. One sensitive and efficient type of bridge circuit for carrying out my invention comprises an arrangement wherein the resistance of the resistor inherently changes inversely with respect to a change of the reactance of the variable reactor.

The novel features which I believe to be characteristic of my invention are set forth in particularity in the appended claims. My invention itself, however, both as to its organization and method of operation, together with further objects and advantages thereof, will be better understood by reference to the following description taken in connection with the accompanying drawing in which the figure shows a preferred embodiment of my invention, as applied to an electric valve converting system.

Referring now more particularly to the figure of the drawing, there is illustrated an arrangement for transmitting energy from an alternating current supply circuit 10 to a direct current load circuit 11. This apparatus comprises a transformer 12 provided with a primary winding connected to the circuit 10 and a secondary winding having an electrical midpoint connected to the negative side of a direct current circuit 11 and the end terminals thereof connected to the positive side of the direct current circuit 11 through the electric valves 13 and 14. Each of the electric valves 13 and 14 is provided with an anode, a cathode, and a control grid and may be any of the several types well known in the art, although I prefer to use valves of the type containing an ionizable medium which are also known as vapor electric discharge valves. As is well understood by those skilled in the art, the amount of power transmitted between the alternating current circuit 10 and the direct current circuit 11 may be controlled by varying the phase of the potential applied between the grid and cathode of each of the valves 13 and 14 with respect to the anode potentials. To this end there is provided a grid circuit comprising a grid current limiting resistor 15 and a transformer 16 which is arranged to be energized from an impedance phase shifting circuit. This impedance phase shifting circuit comprises a pair of adjacent impedance arms 17 and 18 which may be in the form of reactors or inductors. In the instance shown these inductors 17 and 18 comprise a voltage dividing means for the alternating current potential which is impressed thereon by means of the winding 19, thus forming a transformer. The winding 19 is preferably energized from a source of periodic or alternating current 10. One of the remaining arms of the bridge may comprise a variable reactor 20 of the saturable type provided with a direct current control winding 21, which is to be energized from a suitable source of direct current voltage connected to the terminal 22. The other remaining arm of the bridge comprises a current responsive variable resistor which has a current-resistance characteristic preferably non-linear, so that the resistance increases rapidly with an increase of current therethrough, such as a pair of tungsten filament lamps 23 and 24. It will be apparent to those skilled in the art, however, that any other non-linear resistor or impedance of similar current impedance characteristic may be substituted for the lamps 23 and 24 without departing from my invention in its broader aspects.

The general principles of operation of the above described apparatus will be well understood by those skilled in the art. In brief, if the grid potentials of the electric valves 13 and 14 be adjusted by means of the impedance phase shifting circuit substantially in phase with their anode potentials, each of the valves 13 and 14 will be conductive during its complete half cycle of positive anode potential and the average voltage delivered to the direct current circuit 11 will be a maximum. If the grid potentials of the electric valves 13 and 14 be retarded with respect to their anode potentials by means of the impedance phase shifting circuit, each of the valves 13 and 14 will become conductive at some later point in its respective half cycles of positive anode potential and the average voltage impressed upon the direct current circuit 11 will be correspondingly reduced.

It will be apparent to those skilled in the art that the phase of the potential applied to the grids of the valves 13 and 14 could be shifted with respect to the anode voltage impressed thereon on the circuit 10 by means of the transformer 12 if we were to consider the lamps 23 and 24 to be a fixed resistor and saturable reactor 20 to be a variable inductor which has been adjusted to change the inductance value thereon as has been disclosed in the prior art. If we assume that the lamps 23 and 24 are fixed resistors then it will be apparent that the angle of phase shift produced by the bridge circuit will be determined by the degree of saturation of the saturable reactor 20 since the resistance arm is fixed and varied but an inappreciable amount due to temperature variations.

In accordance with my invention, however, the lamps 23 and 24 comprise a convenient form of impedance wherein a rapid increase of resistance will be obtained with any current increase in the bridge. I refer to this type of impedance as having a positive current-impedance characteristic. Thus, with an inherently variable resistance arm having this non-linear current impedance characteristic adjacent to the variable reactor arm, a change in the reactance gives rise to a change of current through the bridge arm adjacent thereto thus causing the resistance of the lamps 23 and 24 to change. This change in resistance of the lamps is of an inverse order with respect to the change of the reactance of the reactor 20 so that decreasing the reactance of the reactor 20 will permit an increased current flow in the arms of the bridge with the result that the resistance offered by the lamps 23 and 24 is increased. Thus, a change in the saturation of the reactor not only changes the reactance of that arm of the bridge but also changes the resistance of the adjacent arm in an inverse manner with the result that the impedance or the resistance ratio of change is greatly magnified. In other words, a small change in the reactance of the reactor 20 together with a change in the resistance of the lamps 23 and 24 provides an increased phase shift between the alternating potentials impressed upon the bridge by means of the winding 19 and the potential appearing across the output diagonal which is connected to the grid transformer 16.

It will thus be apparent that my invention has the advantage that a greater phase shift is obtained with a given change in the control current applied to the saturable reactor and that the arrangement is more efficient because fewer watts of power are dissipated in the arms of the bridge because the current in the bridge arm does not vary over such wide limits as the saturation of the reactor is changed.

While I have shown and described my invention in connection with a certain specific embodiment it will, of course, be understood that I do not wish to be limited thereto, since it is apparent that the principles herein disclosed are susceptible of numerous other applications, and modifications may be made in the circuit arrangement and in the instrumentalities employed without departing from the spirit and scope of my invention as set forth in the appended claims.

What I claim as new and desire to secure by Letters Patent in the United States is:

1. The combination in a bridge circuit for producing a phase shift between the periodic input potential and the output potential comprising a pair of impedances as adjacent arms, a variable impedance element and a variable resistance element in adjacent arms, said elements having opposite impedance-current characteristics, and means controlling only one of said elements for simultaneously effecting an inverse change in the impedance of the other of said elements.

2. The combination in a bridge circuit for producing a phase shift between the periodic input potential and the output potential including a current responsive variable resistance element and a variable impedance element in adjacent arms, and means for controlling only said variable impedance element for simultaneously effecting an inverse change of the resistance in said variable resistance element.

3. The combination in a bridge circuit for producing a phase shift between the periodic input potential and the output potential comprising a pair of impedances as adjacent arms, and a resistor having a non-linear positive resistance-current characteristic, and a variable reactor as adjacent arms.

4. The combination in a bridge circuit for producing a phase shift between the periodic input potential and the output potential including an impedance element and a resistance element as adjacent arms, said resistance element having a resistance-current characteristic such that its resistance changes inversely with a change in the impedance of said impedance element, and means for varying said impedance element.

5. The combination in a bridge circuit for producing a phase shift between the periodic input potential and the output potential comprising a pair of impedances as adjacent arms, and a resistor having a non-linear positive resistance-current characteristic and a saturable reactor as adjacent arms.

6. The combination in a bridge circuit for producing a phase shift between the periodic input potential and the output potential comprising a pair of impedances as adjacent arms, a current responsive variable resistor and a variable inductor as adjacent arms, said variable resistor being characterized in that its resistance varies inversely with respect to a change of inductance in said inductor, and means for varying said inductor thereby to change the current flow through said resistor.

7. An apparatus for producing a potential variable in phase with respect to a source of potential comprising a series circuit of a saturable reactor, a non-linear resistor and a pair of inductors, said inductors being energized from said source of potential, an output circuit connected from a point between said inductors and a point between said resistor and said saturable reactor, and means for controlling the degree of saturation of said latter reactor whereby the resistance of said resistor is varied inversely with respect to the change of reactance of said reactor.

8. An apparatus for producing a potential variable in phase with respect to a source of periodic potential comprising a bridge circuit, an output circuit connected across the diagonal of said bridge circuit, said circuit including an inductor and a saturable reactor as arms of the bridge on one side of said diagonal, an inductor and a non-linear resistor as the remaining arms of said bridge, means for energizing both of said inductors from said source of periodic potential, and means for controlling the degree of saturation of said saturable reactor.

ELMO E. MOYER.